No. 611,225. Patented Sept. 20, 1898.
H. G. SWEENEY.
MACHINE FOR VENDING LIQUIDS.
(Application filed Feb. 2, 1894.)
(No Model.)
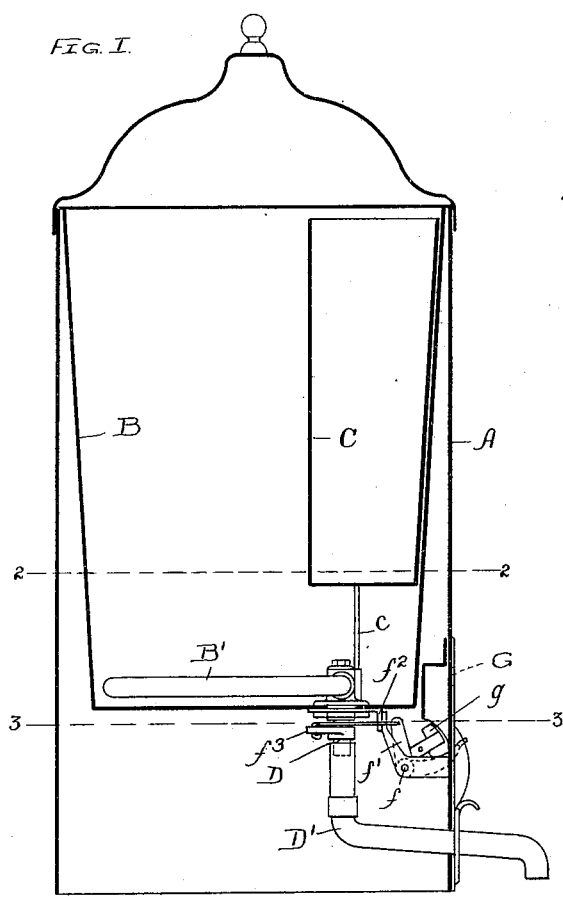
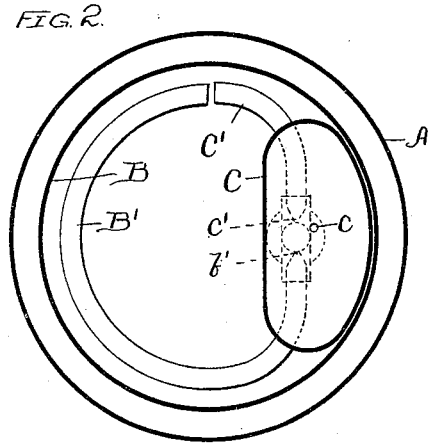
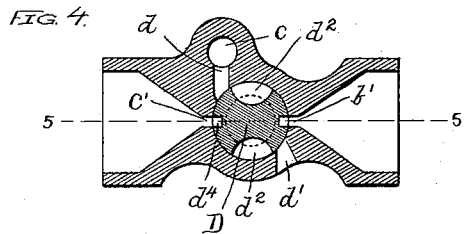
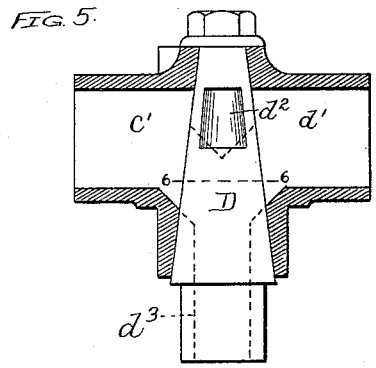
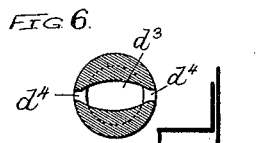
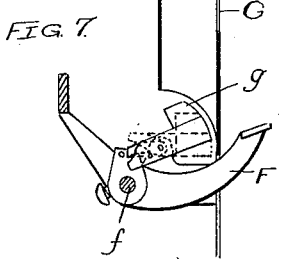
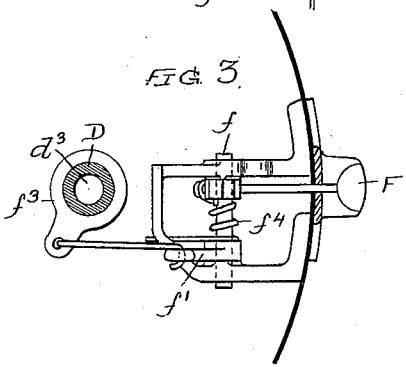
WITNESSES:
INVENTOR:
HENRY G. SWEENEY
BY Munday Evarts & Adcock
HIS ATTORNEYS.

UNITED STATES PATENT OFFICE.

HENRY G. SWEENEY, OF CHICAGO, ILLINOIS.

MACHINE FOR VENDING LIQUIDS.

SPECIFICATION forming part of Letters Patent No. 611,225, dated September 20, 1898.

Application filed February 2, 1894. Serial No. 498,886. (No model.)

*To all whom it may concern:*

Be it known that I, HENRY G. SWEENEY, a citizen of the United States, residing in Chicago, in the county of Cook and State of Illinois, have invented a new and useful Improvement in Machines for Vending Liquids, of which the following is a specification.

This invention relates to that class of machines for vending liquids which are adapted to dispense beverages composed of water and one or more flavoring-syrups. The invention is designed to enable the water and the flavoring-syrup to be first brought together and intermingled at the time they are drawn from the machine.

In the accompanying drawings I show at Figure 1 a vertical section of a vending-machine embodying my invention, at Fig. 2 a horizontal section on the line 2 2 of Fig. 1, and at Fig. 3 a partial horizontal section on the line 3 3 of Fig. 1. Fig. 4 is a horizontal section of the controlling-valve and its case upon the line 4 4 of Fig. 5, and Fig. 5 is a vertical section of the same upon the line 5 5 of Fig. 4. Fig. 6 is a horizontal section of the valve on the line 6 6 of Fig. 5, and Fig. 7 is a partial vertical section of the valve-operating lever and the coin-controlling devices.

In the drawings, A represents the outer cylinder or casing of my improved vending-machine, and B is the water-storage tank thereof. In this tank I place the clear water. The syrup is placed in a separate tank C, which is preferably located inside the water-tank, so it may be cooled by the same ice which is employed to cool the water.

B' is a measuring-receptacle which contains the proportion of water necessary in a glass of the drink dispensed by the machine, and C' is a like receptacle intended to contain the necessary amount of syrup required for a glass of the drink. These measuring-receptacles are most cheaply and easily made of tubing, one end of each being closed and the other end being open and controlled by the valve D. Both are preferably located low down in the water-tank and are filled through the open end by admitting the liquids through ports in the valve-casing. The syrup-tank is joined to the valve-casing by a short pipe $c$, said pipe opening into the port $d$ at one side of the valve. The valve-casing is also open at $d'$ to admit the water from the tank to the valve.

The valve stands vertically and is provided upon its opposite sides with recesses $d^2$, and its lower portion is hollow, as at $d^3$. It is also provided with ports $d^4$ at opposite sides, opening into the passage $d^3$ and adapted to be moved in register with the open ends or mouths $b'$ and $c'$ of the measuring-receptacles. The valve is shown at Fig. 4 in the position it occupies when discharging, and in this position both the water and the syrup from their respective measuring-chambers enter the valve through the ports $d^4$ and pass out through the central longitudinal passage $d^3$. In this position of the valve also the ports $d$ and $d'$ are both closed. After the machine has been patronized the valve is returned to its normal position, as hereinafter stated, and in that position the recesses $d^2$ open communication between the syrup-port $d$ and the syrup-measuring receptacle and between the water-port $d'$ and the water-measuring receptacle, as will be understood, and the measuring-receptacles are both at once refilled from their respective tanks and thereafter remain charged until the next sale. While the valve is in this normal position the discharge-ports $d^4$ are closed. The water and syrup first come together and are intermingled in the passage $d^3$ and pass from thence into the delivery-pipe D'.

The valve is operated by a lever F, mounted upon a pivot $f$ and adapted to be depressed by the thumb of the purchaser. The pivot $f$ carries an arm $f'$, which is connected by a wire $f^2$ to an arm $f^3$, standing out from the valve, as plainly illustrated at Fig. 3. A retracting-spring $f^4$ encircles the pivot $f$. It will thus be seen that the purchaser by repressing the thumb-lever moves the valve from its normal position to that shown at Fig. 4, thereby allowing the discharge of the contents of the measuring-receptacles, at the same time shutting off the flow of water and syrup from the storage-tanks. As soon as the measuring-receptacles are empty and the purchaser releases his pressure upon the lever the retracting-spring causes the parts to move back to their normal positions and allows the recharging of the measuring-receptacles.

There is also present in the machine a coin-controlling mechanism. I have not illustrated this mechanism in detail because any suitable coin-controlling mechanism which is adapted to control the lever F may be used. In the mechanism shown the coin is inserted at the slot-opening G, falls into the coin-arrester g, and through said coin-arrester is made to release the lever F, so it may be operated.

In many of this class of machines the measuring-receptacle is located outside the storage-tank, and it will be understood that I do not therefore wish to be limited to the location of either of the measuring-receptacles which I have shown.

It will be understood that I do not wish to limit myself to the precise construction which I have shown and described.

I claim—

1. In a liquid-dispensing apparatus, the combination of separate tanks adapted to contain separate liquids, measuring-chambers communicating with the tanks and a multipass valve simultaneously controlling the passage of the liquid into and from the chambers, substantially as specified.

2. In liquid-dispensing apparatus, the combination of separate tanks adapted to contain separate liquids, measuring-chambers in communication respectively therewith, and a multipass coin-actuated valve controlling the passage of liquid into and from the chambers and adapted to simultaneously discharge the chambers and at the same time cut off communication with the tanks.

3. In liquid-vending apparatus, the combination of separate tanks adapted to contain separate liquids, a multipass valve controlling a simultaneous discharge of both liquids, means for measuring the liquids separately before discharging, and coin-controlled mechanism for permitting the operation of the valve.

4. In liquid-vending apparatus, the combination of separate tanks adapted to contain separate liquids, measuring-chambers, passages between the tanks and their respective chambers, a multipass valve controlling said passages and permitting the liquids to be mixed in measured proportions and be discharged, and coin-controlled mechanism for permitting the operation of the valve.

HENRY G. SWEENEY.

Witnesses:
H. M. MUNDAY,
EDW. S. EVARTS.